Jan. 18, 1938.  C. L. GEORGE  2,106,000
FAIRLEAD
Filed Nov. 25, 1936 — 2 Sheets-Sheet 1
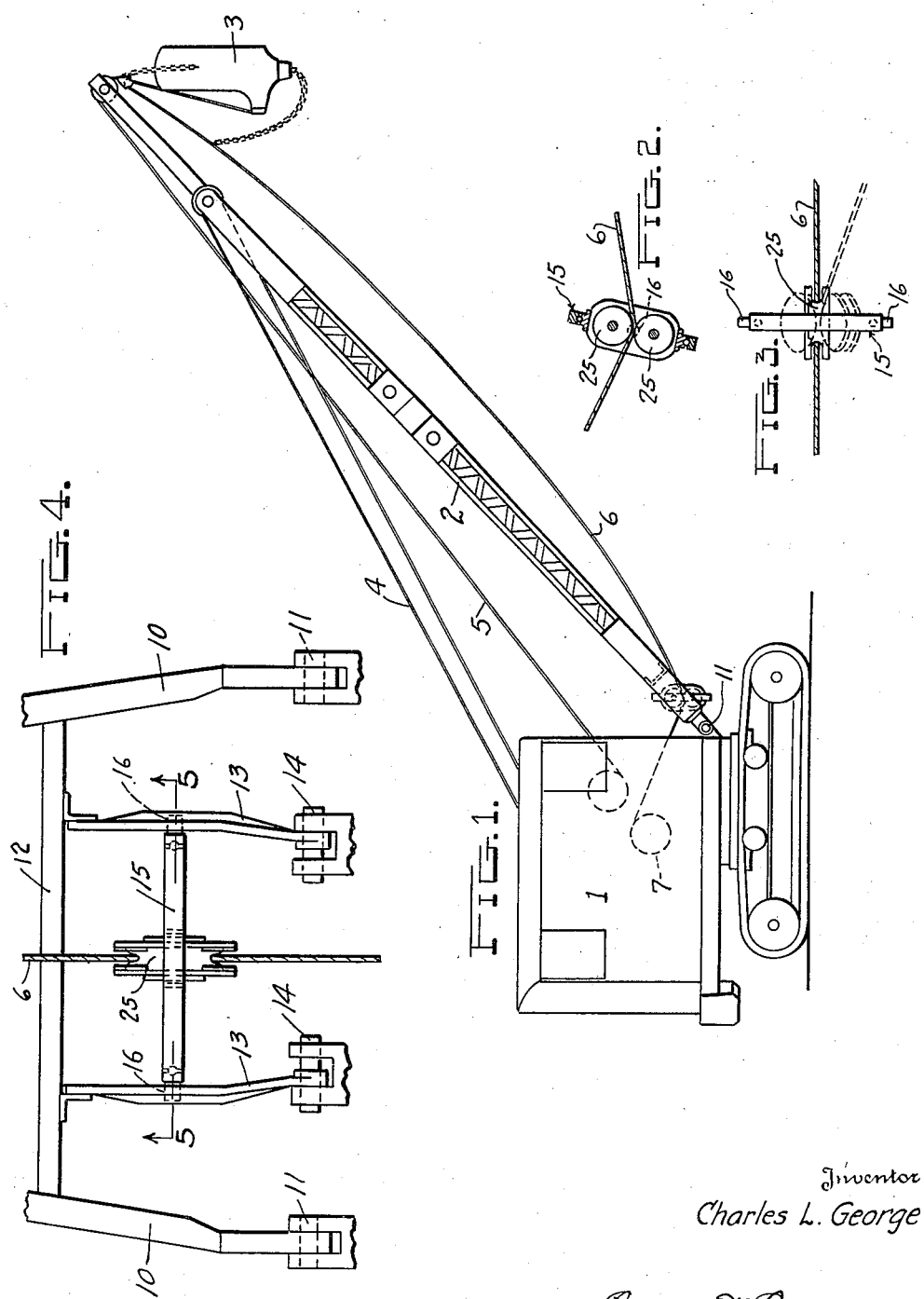
Inventor
Charles L. George
By Owen & Owen,
Attorneys

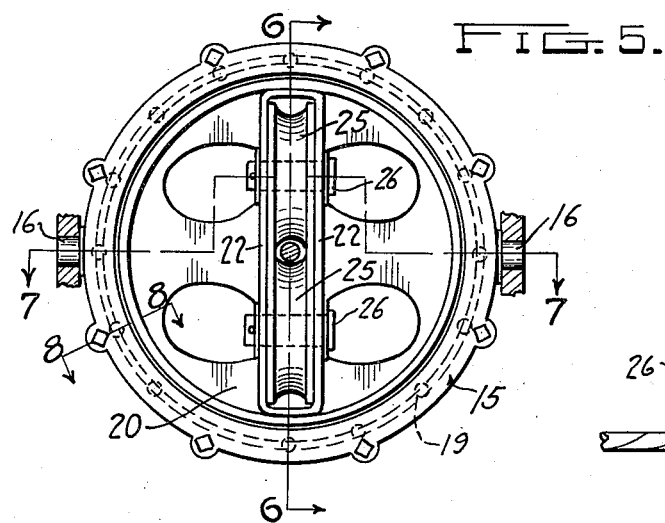
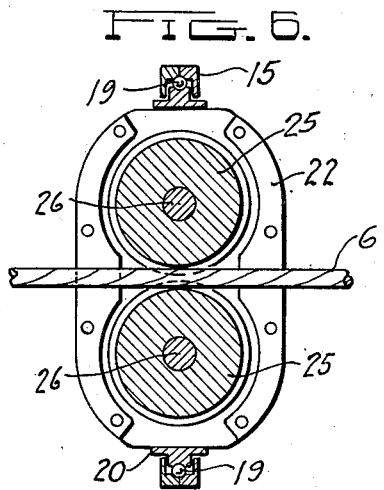
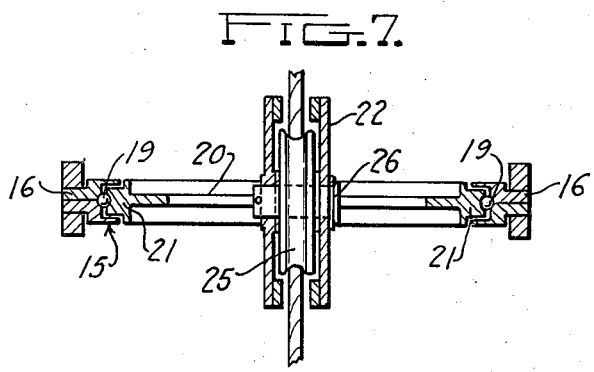
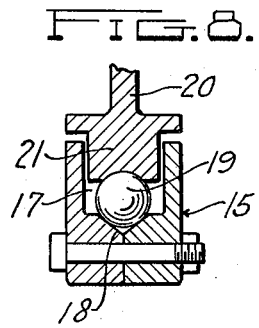

Patented Jan. 18, 1938

2,106,000

UNITED STATES PATENT OFFICE 2,106,000

FAIRLEAD

Charles L. George, Findlay, Ohio, assignor to The Buckeye Traction Ditcher Company, Findlay, Ohio, a corporation of Ohio Application November 25, 1936, Serial No. 112,677

2 Claims. (Cl. 254—190)

This invention relates to fairleads, and particularly to those adapted for use in connection with the bucket drag lines of boom type bucket excavators.

The object of the invention is the provision of a simple and inexpensive form of fairlead of the class described, which preferably includes a single pair of guide sheaves for the drag line, and which sheaves are mounted to automatically adjust themselves to the lines of force of the drag line thereon, so that the line of force of the drag line against the engaged sheave is directly radial to its axis. In other words, the purpose of the invention is the provision of a fairlead having a single pair of peripherally opposed cooperating guide sheaves for the drag line, the mounting of said sheaves being such that they will freely assume any position necessary to place the common diametrical plane of the sheaves in coincident relation with the line of applied force of the drag line thereon, said line of force varying in accordance with the position of the associated bucket with respect to the machine boom.

The invention is fully described in the following specification, and while it is capable of embodiment in numerous forms, a preferred embodiment thereof is illustrated in the accompanying drawings, in which—

Figure 1 is a diagrammatic side elevation of a boom type bucket excavator embodying the invention; Fig. 2 is a detail of the fairlead embodying the invention illustrating the position of the sheaves of the fairlead with respect to the lines of force acting on the drag line; Fig. 3 is a different detail of the fairlead showing in full lines the position of the sheaves when the lines of force acting on the drag line are both lengthwise of the boom; Fig. 4 is an enlarged detail of a manner of connecting the fairlead to the inner end portion of the boom; Fig. 5 is an enlarged section on the line 5—5 in Fig. 4; Figs. 6 and 7 are sections on the lines 6—6 and 7—7, respectively, in Fig. 5, and Fig. 8 is an enlarged section on the line 8—8 in Fig. 5.

Referring to the drawings, I designates the customary rotatable or swinging housing of a bucket-type excavating machine, 2 the boom extending from one side thereof and mounted for vertical swinging movements relative to the housing and 3 the excavating bucket extended from the free end of the boom. The raising and lowering of the boom is controlled by a cable 4, or in any other suitable manner. The hoist line of the bucket is designated 5 and the customary drag line therefor is designated 6 and winds at its inner end on a control drum 7 in the housing.

In the present instance, the boom 2 terminates at its inner end in spaced legs 10, 10, which are pivoted in axial alignment to the housing 1, as at 11, for vertical swinging movements. The legs 10, 10, a short distance outward from their pivots, are rigidly connected by a cross-piece 12, and projecting therefrom lengthwise of the legs 10 toward their pivoted ends are two transversely spaced frame arms 13, 13. In the present instance, the arms 13 are pivoted at their outer ends, with respect to the cross-piece 12, to the housing 1 in axial alignment with the boom pivots 11, as shown at 14 in Fig. 4.

A circular or ring-form of guide frame 15 is mounted between the frame members 13, 13 for pivotal or rocking movements in a vertical plane, being provided for such purpose with diametrically opposed trunnions 16, which journal in suitable bearings in the respective members 13. The guide frame 15 is of U-form in cross-section or provided in its inner peripheral wall with a continuous channel or guide-way 17 (Fig. 8) the bottom wall of which is provided with a ball race 18 for a set of anti-friction ball bearings 19.

A circular sheave frame 20 is mounted in the guide frame 15, being provided for such purpose with a peripheral bearing rib 21 which enters the guide frame channel 17 and has a peripheral race in engagement with the ball bearings 19. The sheave frame 20, in diametric intersecting relation to its axis, is provided with spaced opposing walls forming a sheave housing 22, with the space between said walls open at opposite sides of the sheave frame and disposed at right angles to the plane of the guide frame 15.

A pair of transversely opposed sheaves 25 is mounted in the housing 22, with the cable receiving space therebetween coincident with the swivel axis of the sheave frame 20. The bearing shafts or studs 26 of these sheaves are mounted in the housing in the plane of the bearings 19.

The drag line 6 extends between and is guided by the sheaves 25 and it is apparent that while the direction of the line of force of the inner end portion of the drag line or that portion between the sheaves and the control drum 7 is substantially constant or unchanged, the direction of the line of force of the outer end portion of the drag line, or that without the sheaves 25, varies and changes with the position of the bucket 3 with respect to the sheaves and that this change accordingly effects a change in the position of the sheaves with respect to the boom. If the line of force applied to the outer end portion of the drag line is lengthwise of the boom or in the vertical plane of the boom, the sheaves 25 will stand in vertical position and the tilt of the guide frame 15 relative to the boom will depend on the angle formed by the outer and inner end portions of the drag line, as shown in Figs. 1 and 2. If the pull on the outer end portion of the drag line is from one side or the other of the vertical plane of the boom, the sheave frame will automatically adjust itself in the guide frame to place the sheaves in a plane which is substantially common to the planes of the lines of forces of the inner and outer drag line portions. In other words, whenever the forces acting on the inner and outer ends of the drag line are out-of-true longitudinal alignment or in angular relation to each other, the resultant lateral pressure or line of force applied to the engaged sheave 25 is always directly radial of the sheave. It is apparent that this is made possible by reason of the double swivel mounting of the sheave frame, which permits the latter to not only rock on a horizontal axis, but also to turn freely within the guide frame 15 in any position of its rocking movement. In other words, the guide frame is always free to adjust itself so that whatever force is applied laterally of the drag line to one or the other of the guide sheaves is directly radial to the sheave axis. This eliminates friction and binding of the drag line on the fairlead sheaves, no matter what the angle of applied forces, and enables the fairlead to act as freely with one angle of divergence of forces of the drag line as with another.

I wish it understood that my invention is not limited to any specific construction, arrangement or form of the parts, as it is capable of numerous modifications and changes without departing from the spirit of the claims.

Having thus described my invention, what I claim as new, and desire to secure by United States Letters Patent, is:

1. In a fairlead, a guide frame mounted for pivotal rocking movement in one plane, a sheave frame mounted in the guide frame for swivel movements about an axis transverse to the rocking axis of the guide frame, a pair of sheaves mounted in peripherally opposed relation in said sheave frame with the cable guide space therebetween substantially coincident with the swivel axis of the sheave frame, the axes of said sheaves being disposed in a plane substantially common to the rocking axis of the guide frame and substantially at right angles to the swivel axis of the sheave frame.

2. In a fairlead, an annular guide frame having diametrically opposed bearing trunnions adapted when mounted to permit a rocking of the frame, a sheave frame mounted in said guide frame for swivel movements relative thereto about an axis at right angles to the rocking axis of the guide frame, a pair of peripherally opposed guide sheaves mounted in said sheave frame with their axes in the plane of swivel movements of the sheave frame and with the cable guiding space between the sheaves substantially coincident with said swivel axis.

CHARLES L. GEORGE.